United States Patent [19]

Löper

[11] 4,037,134

[45] July 19, 1977

[54] INSTALLATION FOR AUTOMATIC CONTROL OF THE LIGHT DISTANCE WITH MOTOR VEHICLE HEADLIGHTS

[75] Inventor: Bernd Löper, Korb, Germany

[73] Assignee: Daimler-Benz Aktiengesellschaft, Germany

[21] Appl. No.: 642,569

[22] Filed: Dec. 19, 1975

[30] Foreign Application Priority Data

Dec. 20, 1974 Germany ............................ 2460426

[51] Int. Cl.² ............................................. B60Q 1/12
[52] U.S. Cl. ................... 315/78; 240/7.1 LJ; 240/8.25; 240/62.2; 315/82
[58] Field of Search ............... 315/78, 82; 240/7.1 LJ, 240/8.25, 62 R, 62.2

[56] References Cited

U.S. PATENT DOCUMENTS 3,614,416  10/1971  Fleury ............................. 240/8.25

Primary Examiner—Eugene La Roche
Attorney, Agent, or Firm—Craig & Antonelli

[57] ABSTRACT

An installation for the automatic control of the light projection distance of motor vehicle headlights in dependence on the positional change of the vehicle body, in which in case of a positional change of the vehicle body toward one side when driving through a curve, an analogous control of the light projection distance of the headlight takes place in such a manner that, for example, with right-hand traffic and when driving through a right-hand curve, the light projection distance is decreased and vice versa is increased in a left-hand curve.

12 Claims, 4 Drawing Figures

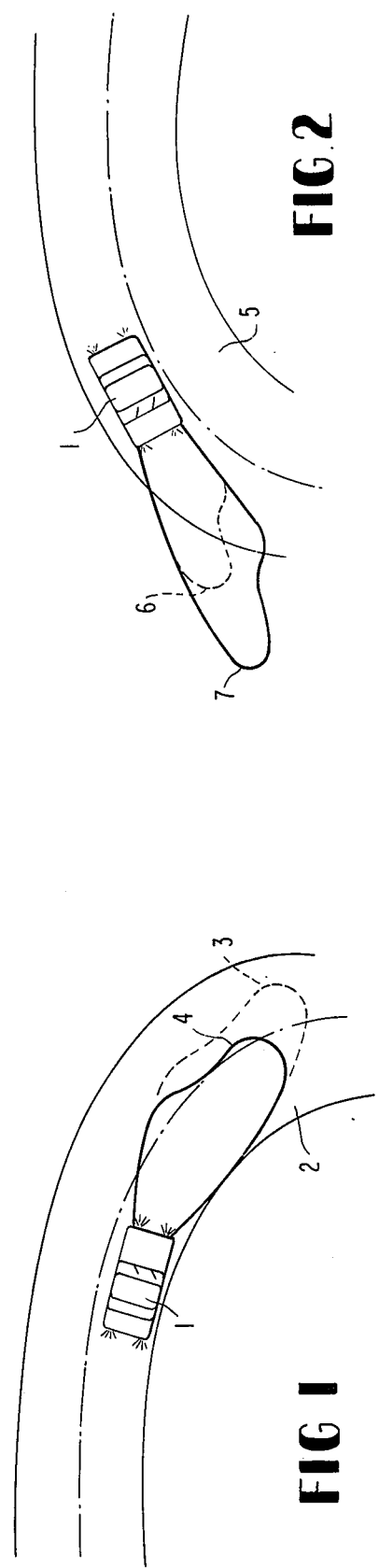
FIG. 2
FIG. 1
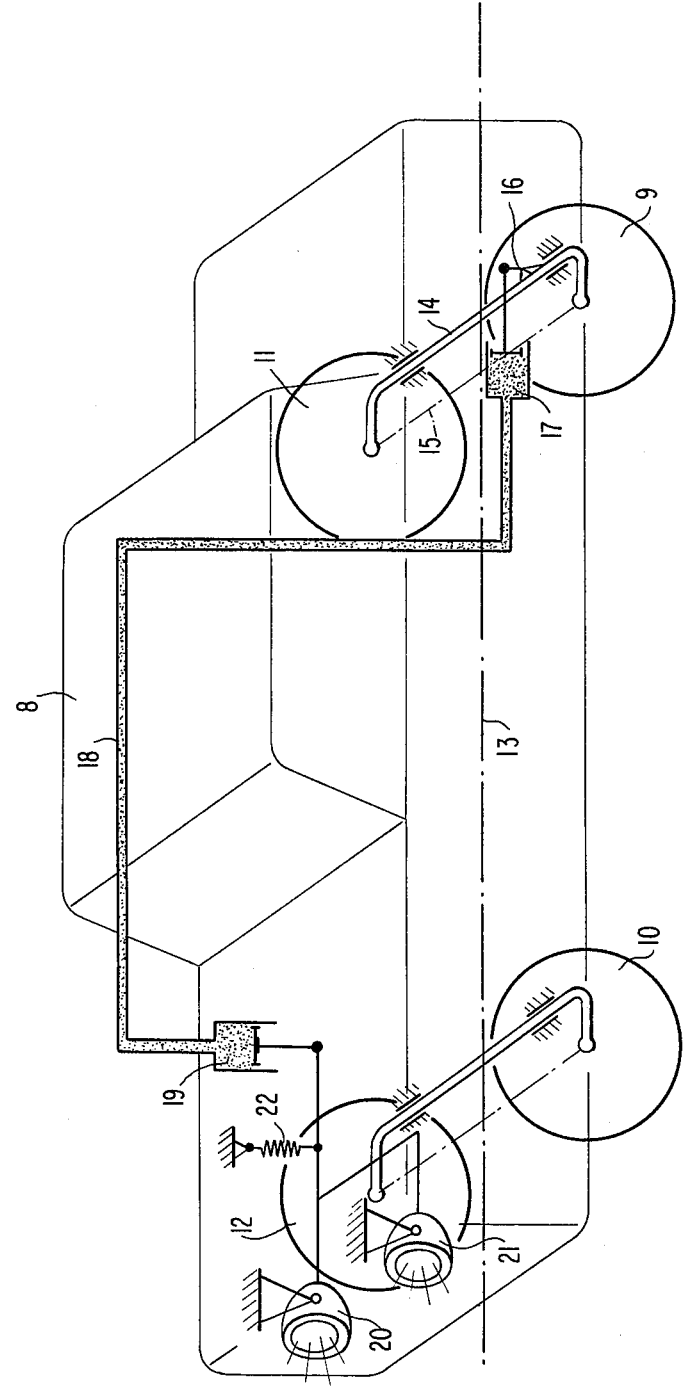
FIG. 3

INSTALLATION FOR AUTOMATIC CONTROL OF THE LIGHT DISTANCE WITH MOTOR VEHICLE HEADLIGHTS

The present invention relates to an installation for the automatic control of the light or illuminating projecting distance of motor vehicle headlights in dependence on a positional change of the vehicle body.

Hitherto known installations of this type regulate the light projection distance of the headlights with inward and outward spring deflections of the vehicle which are equal on both sides so that the road surface is illuminated uniformly independently of the load condition of the vehicle. The lift movements of the vehicle are thereby picked up, for example, in the center of the front axle or rear axle stabilizer in order to pick up only spring movements of the vehicle which are equal on both sides, for regulating the headlights. The disadvantages of such a construction reside in that alternate inward and outward spring deflections, i.e., which are not equal on both sides, are not detected or picked-up when driving through curves, in which under the influence of the centrifugal forces, unilateral inclinations of the vehicle body about the vehicle longitudinal axis toward one or the other side occur. This leads to the fact that, for example, in countries with right-hand traffic and when travelling through a right-hand curve, the counter-traffic is blinded by the right headlight which is normally adjusted so as to light up or illuminate a greater distance. In a left curve, in contrast thereto, the right road edge is inadequately illuminated.

The present invention is therefore concerned with the task to provide with simple means from a structural and manufacturing point of view a light-distance control system which far-reachingly prevents the aforementioned disadvantages during driving through a curve with alternate inward and outward spring deflection of the vehicle, i.e., with inward and outward spring deflections of the vehicle which are not equal but instead are oppositely directed.

The underlying problems are solved according to the present invention in that with a unilateral positional change of the vehicle body during driving through a curve, an analogous regulation of the light projection distance of the headlight takes place in such a manner that, for example, with right-hand traffic, the light distance is decreased when travelling through a right-hand curve and vice versa is increased in a left-hand curve.

In one advantageous embodiment of the present invention, the analogous control of the light projection distance in the same sense is effected by at least one eccentrically arranged controller which picks-up identical inward or outward spring deflections of one wheel of one axle differently from that of the other wheel of the same axle.

Additionally, it may be advantageous if the control of the analogous light distance in the same sense is realized by two controllers, namely one for the front axle and one for the rear axle.

Finally, it may be desirable, for example, for vehicles to be exported that the control of the light distance is adapted to be shifted from right- to left-hand traffic and vice versa by means of a switch.

Accordingly, it is an object of the present invention to provide an installation for the automatic control of the light projection distance of motor vehicle headlights which avoids by simple means the aforementioned shortcomings and drawbacks encountered in the prior art.

Another object of the present invention resides in an installation for the automatic control of the light distance in motor vehicle headlights, in which inclinations of the vehicle body during driving through curves are utilized to control the light distance of the headlights.

A further object of the present invention resides in an installation for the automatic regulation of the light projection distance in motor vehicle headlights which is simple from a structural point of view and can be manufactured in a relatively inexpensive manner.

Still another object of the present invention resides in an installation for the automatic control of the light projection distance in motor vehicle headlights which can be readily installed into a motor vehicle and utilizes a minimum of parts.

A further object of the present invention resides in an installation for the automatic control of the light projection distance of motor vehicle headlights, in which when travelling through curves, a blinding of the oppositely directed traffic is minimized while at the same time the road edge is always adequately illuminated.

These and further objects, features and advantages of the present invention will become more apparent from the following description when taken in connection with the accompanying drawing which shows, for purposes of illustration only, one embodiment in accordance with the present invention, and wherein:

FIG. 1 is a schematic plan view illustrating a vehicle with and without controllable headlights with right-hand traffic in a right-hand curve;

FIG. 2 is a schematic plan view corresponding to FIG. 1 in a left-hand curve;

FIG. 3 is a schematic perspective view of one embodiment of a light projection distance control system in accordance with the present invention.

Figure 4:
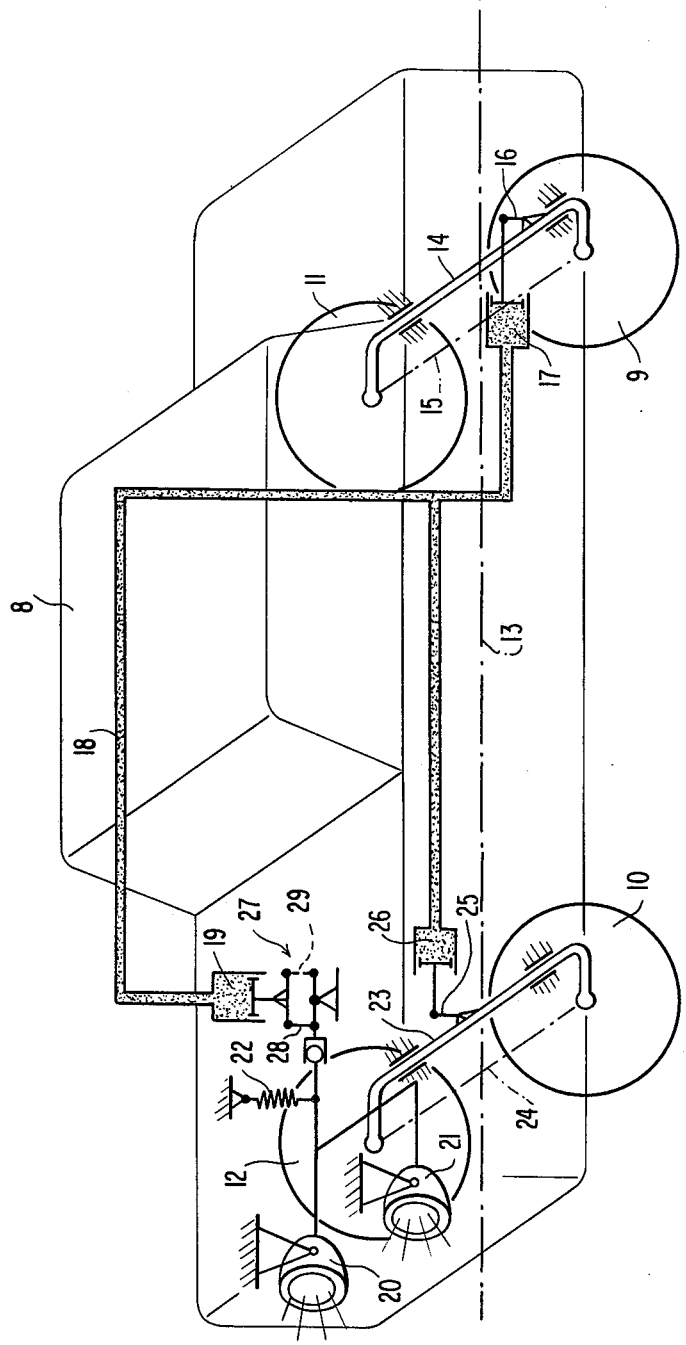
FIG. 4 is a schematic perspective view of a modified embodiment of a light projection distance control system in accordance with the present invention.

Referring now to the drawing wherein like reference numerals are used throughout the various views to designate like parts, FIGS. 1 and 2 illustrate a vehicle 1 while travelling through a right-hand curve 2 in right-hand traffic, with a non-regulated light distance 3 and with a light-distance 4 regulated in accordance with the present invention and indicating the reduced blinding of the oppositely directed traffic produced thereby (FIG. 1) as well as a vehicle 1, when driving through a left-hand curve 5 in right-hand traffic, with a non-regulated light distance 6 and with a regulated light-distance 7 in accordance with the present invention (FIG. 2), and the additional illumination of the right road surface boundary achieved thereby.

FIG. 3 illustrates schematically the light distance control system of a motor vehicle 8. When travelling through a right-hand curve in right-hand traffic, an inward spring deflection occurs at the wheels 9 and 10 located on the outside of the curve whereas an outward spring deflection takes place at the wheels 11 and 12 located on the inside of the curve, whereby the vehicle body inclines about the vehicle longitudinal axis 13 in the driving direction toward the left in the direction toward the outer curve edge. A controller 16 of conventional construction is pivotally connected at the rear axle stabilizer 14 of a rear axle 15 at a predetermined distance to the vehicle longitudinal axis 13 in the direction toward the outside of the curve, the controller 16

6. An installation according to claim 5, characterized in that with a right-handed traffic, when driving through a right-handed curve, the light distance is decreased, and the light distance is increased when driving through a left-handed curve.

7. An installation according to claim 1, characterized by switch means enabling the shifting of the control of the light projection distance from right-hand traffic to left-hand traffic and vice versa.

8. An installation for automatically controlling motor vehicle headlights in dependence on the positional changes of the vehicle body of the motor vehicle with respect to at least one of the front and rear axles thereof, comprising a pair of headlights, mounting means for mounting said headlights at the front of the vehicle body for pivoting movement about a horizontal axis transverse to the longitudinal axis of the vehicle, detection means for detecting movement of the vehicle body with respect to a point on one of the vehicle axles spaced from the longitudinal axis of the vehicle, and control means responsive to said detection means for pivoting said headlights about said horizontal axis in such a manner that when driving through a curve located on the outside in relation to the oppositely directed traffic, the light projection distance of the headlights is decreased, and when driving through a curve located on the inside in relation to the oppositely directed traffic, the light projection distance is increased.

9. An installation according to claim 8, wherein said control means includes biasing means for biasing said headlihgts so that the optical axes thereof are directed in a predetermined normal driving direction and pivoting means for pivoting said headlights to adjust the optical axes thereof above and below said predetermined normal driving directions.

10. An installation according to claim 9, wherein said control means includes a first controller means connected to a point on the rear vehicle axle spaced from the longitudinal axis of said vehicle for operating said pivot means to raise and lower said headlights in response to movement of said vehicle body away and toward said point on said rear axle.

11. An installation according to claim 10, wherein said control means further includes a second controller means connected to a point on the front vehicle axle for operating said pivot means to lower and raise said headlights in reponse to movement of said vehicle body away and toward said point on said front axle.

12. An installation according to claim 11, characterized by switch means enabling the shifting of the control of the light projection distance from right-hand traffic to left-hand traffic and vice versa.

* * * * *